(12) United States Patent
Chuang et al.

(10) Patent No.: US 9,768,982 B2
(45) Date of Patent: Sep. 19, 2017

(54) SIGNAL TRANSMISSION METHOD AND COMMUNICATION SYSTEM USING THE SAME

(71) Applicant: REALTEK SEMICONDUCTOR CORP., Hsinchu (TW)

(72) Inventors: Sheng-Fu Chuang, Taichung (TW); Liang-wei Huang, Hsinchu (TW); Hsuan-Ting Ho, Taichung (TW); Ching-Yao Su, Taichung (TW)

(73) Assignee: REALTEK SEMICONDUCTOR CORP., Hsinchu (TW)

( * ) Notice: Subject to any disclaimer, the term of this patent is extended or adjusted under 35 U.S.C. 154(b) by 0 days.

(21) Appl. No.: 14/919,783

(22) Filed: Oct. 22, 2015

(65) Prior Publication Data

US 2016/0301431 A1 Oct. 13, 2016

(30) Foreign Application Priority Data

Apr. 7, 2015 (TW) .............................. 104111095 A

(51) Int. Cl.
*H04L 27/00* (2006.01)
*H04L 12/66* (2006.01)

(52) U.S. Cl.
CPC .................... *H04L 12/66* (2013.01)

(58) Field of Classification Search
CPC ................................................... H04L 25/0272
USPC .......................................................... 375/295
See application file for complete search history.

(56) References Cited

U.S. PATENT DOCUMENTS

| | | | | |
|---|---|---|---|---|
| 6,121,894 A | * | 9/2000 | Yankielun | G01N 17/00 340/870.31 |
| 2013/0057069 A1 | * | 3/2013 | Meredith-Jones | G05F 1/67 307/43 |
| 2014/0320112 A1 | * | 10/2014 | Nodera | G01R 15/183 324/127 |

FOREIGN PATENT DOCUMENTS

CN 1271576 C 8/2006

\* cited by examiner

*Primary Examiner* — Lihong Yu
(74) *Attorney, Agent, or Firm* — Li & Cai Intellectual Property (USA) Office

(57) ABSTRACT

A signal transmission method is provided. The method includes the following steps. First, an output signal filtered from a square wave signal by a high pass filter is received. Then, the output signal is sampled at each time interval, so as to generate the sampled values. Next, the sampled values are compared with at least one threshold to generate comparison results. Finally, a signal pattern corresponding to the output signal is identified according to the comparison results.

11 Claims, 7 Drawing Sheets

SIGNAL TRANSMISSION METHOD AND COMMUNICATION SYSTEM USING THE SAME

BACKGROUND OF THE INVENTION

1. Field of the Invention

The instant disclosure relates to a signal transmission method; in particular, to a signal transmission method preventing ambient noises in wired channels and a communication system using the method.

2. Description of Related Art

Generally, there are many interference sources in the vehicle communication environment, e.g., engines, window wipers, motors, etc. Thus, reliability of the communication quality should to be carefully considered in the design of the vehicle communication system. So far, test standards commonly used for testing the reliability are, for example, the IEC 62132-4 Direct RF Power Injection Method, the IEC 62215-3 Non-Synchronous Transient Injection Method or the like, in which common mode signals with large amplitude and large power are used to execute the tests. In channel tests, a reliable communication system cannot tolerate transmission errors even when interfered by noise.

Further, for instance, a vehicle communication device would be switched to the power-saving mode when there is no transmission of data, and would wait for other vehicle communication devices to transmit wake up signals. In this case, even in the condition that noise exists, the vehicle communication device under the power-saving mode should not be waked up wrongly or unable to be waked up, such that the operation safety of the device or element connected to the vehicle communication device could be assured.

SUMMARY OF THE INVENTION

The instant disclosure provides a signal transmission method. The signal transmission method includes: receiving an output signal generated by a square wave signal passing through a high pass filter; sampling the output signal at each time interval so as to generate a plurality of sampled values; comparing the sampled values with at least one threshold to generate a plurality of comparison results; and identifying a signal pattern corresponding to the output signal according to the comparison results.

The instant disclosure further provides a communication system, and the communication system comprises a first communication device and a second communication device. The first communication device comprises a signal generation module and a first transceiver module. The signal generation module is configured to generate a square wave signal. The first transceiver module is configured to transmit an output signal and comprises a common mode filter unit filtering out a high frequency portion of the square wave signal as the output signal. The second communication device comprises a second transceiver module and a determination unit. The second transceiver module is configured to receive the output signal. The determination unit is configured to sample the output signal at each time interval so as to generate a plurality of sampled values, compares the sampled values with at least one threshold and generates a plurality of comparison results, and identifies a signal pattern corresponding to the output signal according to the comparison results.

The instant disclosure further provides another communication system. The communication system comprises a first communication device and a second communication device. The first communication device comprises a signal generation module and a first transceiver module. The signal generation module generates a square wave signal. The first transceiver module transmits an output signal and comprises a common mode filter unit. The common mode filter unit filters out a high frequency portion of the square wave signal as the output signal. The second communication device comprises a second transceiver module and the second transceiver module receives the output signal and comprises a determination unit. The determination unit samples the output signal at each time interval so as to generate a plurality sampled values, compares the sampled values with at least one threshold and generates a plurality of comparison results, and identifies a signal pattern corresponding to the output signal according to the comparison results.

For further understanding of the instant disclosure, reference is made to the following detailed description illustrating the embodiments and embodiments of the instant disclosure. The description is only for illustrating the instant disclosure, not for limiting the scope of the claim.

DETAILED DESCRIPTION OF PREFERRED EMBODIMENTS

In the wired channel transmission, a capacitor is usually placed at the signal output and configured to block the common mode direct voltage of the chip, so the common mode current could be prevented from leaking to the external network cables. In order to further protect the communication environment, a common mode choke is used to suppress the common mode noise, and an additional common mode filter is used to filter the noise. In the present disclosure, the common mode filter is configured to increase amplitude of the output signal such that the output signal is capable of bearing interference in the wired channel transmission. Thus, the signal transmission method and system provided by the present disclosure is capable of letting the output signal have large amplitude without changing the original circuit, and the output signal's tolerance for the interference in the wired channel transmission would be improved. Details are further illustrated in the following description.

Figure 1A:
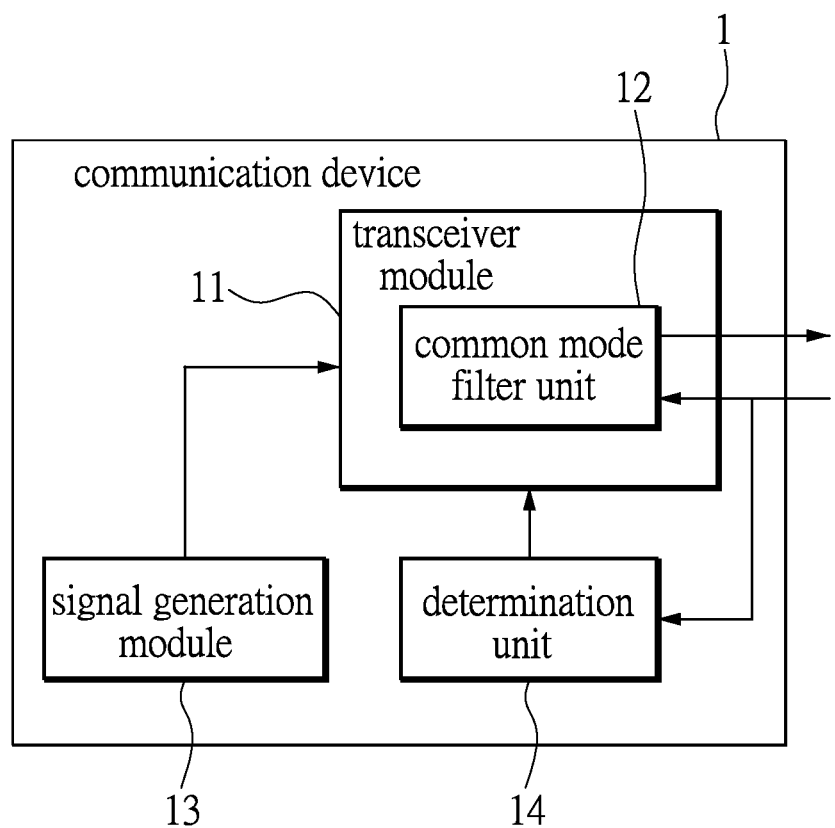
FIG. 1A shows a block diagram of a communication device in one embodiment of the disclosure.

Referring to FIG. 1A, FIG. 1A shows a block diagram of a communication device in one embodiment of the disclosure. The communication device 1 comprises a transceiver module 11, a signal generation module 13 and a determination unit 14. The transceiver module 11 comprises a common mode filter unit 12. The transceiver module 11 is electrically coupled to the signal generation module 13 and the determination unit 14.

In some embodiments, the communication device 1 is a vehicle wired communication device for the moving vehicles to exchange information.

The transceiver module 11 comprises a proper logic, circuit and/or coding for transmitting an output signal to another communication device 1, or for receiving an output signal output by another communication device 1. More precisely, each communication device 1 transmits the data signals in a wired way via the transceiver module 11.

In the transceiver module 11, the common mode filter unit 12 is configured to generate an output signal at a high frequency or to receive an output signal transmitted by another communication device 1. In some embodiments, the common mode filter unit 12 is configured to be a high pass filter (HPF). The common mode filter unit 12 is a filter that lets the high frequency signal pass and reduces the signal of which the frequency is lower than a cut-off frequency. In other words, the output signal is a high frequency portion of the input signal (such as the signal generated by the signal generation module 13) which is filtered out by the high pass filter.

Figure 1B:
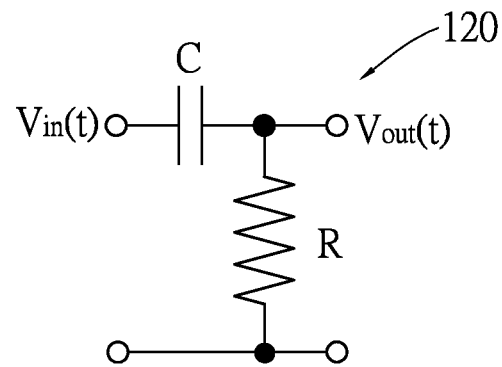
FIG. 1B shows a circuit diagram of a high pass filter in one embodiment of the disclosure.

Referring also to FIG. 1B, FIG. 1B shows a circuit diagram of a high pass filter in one embodiment of the disclosure. According to the Kirchhoff's Current Law (KCL) and the property of capacitor C, the voltage Vout(t) of the high pass filter 120 in FIG. 1B is shown in the following equations (1)-(3):

$$V_{out}(t) = I(t)R \quad (1)$$

$$Q_c(t) = C[V_{in}(t) - V_{out}(t)] \quad (2)$$

$$I(t) = \frac{dQ_c}{dt} \quad (3)$$

Wherein, Qc(t) is the charge quantity of the capacitor C and I(t) is the current flowing through the resistor R. After calculating with the equations (1)-(3), an equation (4) would be obtained as:

$$V_{out}(t) = RC\left(\frac{dV_{in}(t)}{dt} - \frac{dV_{out}(t)}{dt}\right) \quad (4)$$

When dt is small enough (approaching to zero), the sequential voltage signals are considered discrete voltage signals represented as an equation (5):

$$y_i = RC\left(\frac{x_i - x_{i-1}}{\Delta T} - \frac{y_i - y_{i-1}}{\Delta T}\right) \quad (5)$$

After that, the equation (5) can be rewritten as a recursive equation (6):

$$y_i = \frac{RC}{RC + \Delta T} y_{i-1} + \frac{RC}{RC + \Delta T}(x_i - x_{i-1}) \quad (6)$$

According to the above equation (6), in the situation that the transceiver module 11 emits signals, when the input signal received by the common mode filter unit 12 is a periodical square wave signal and when the periodical square wave signal is changed from a negative voltage to a positive voltage, the positive output voltage of the output signal output by the high pass filter 120 is twice of the amplitude of the periodical square wave signal. On the other hand, when the periodical square wave signal received by the common mode filter unit 12 is changed from a positive voltage to a negative voltage, the negative voltage of the output signal output by the high pass filter 120 is twice of the amplitude of the periodical square wave signal. Moreover, after the common mode filter unit 12 is changed, the periodical square wave signals received later are maintained at a negative voltage or a positive voltage, and the positive output voltage or the negative output voltage of the output signal approaches to zero with time passing.

Figure 2A:
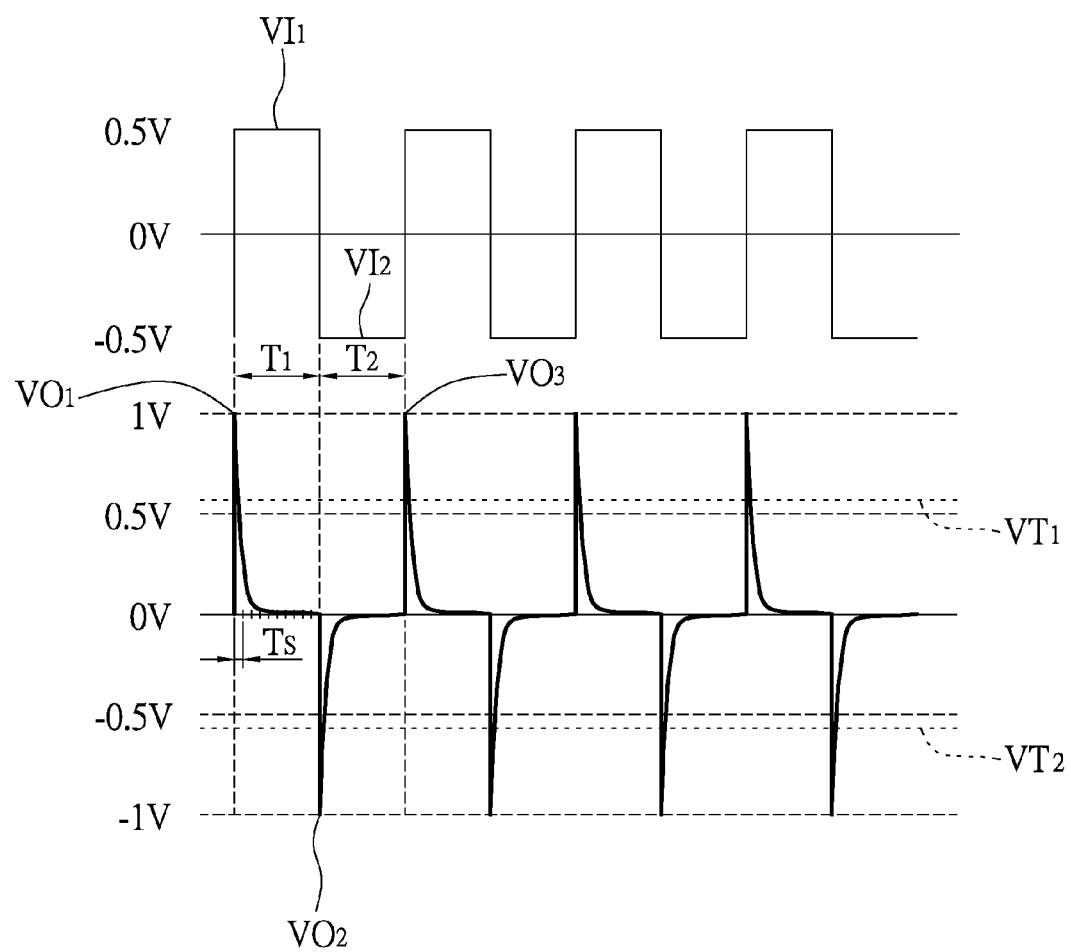
FIG. 2A shows a schematic diagram of input signals and output signals in one embodiment of the disclosure.

Please also refer to FIG. 2A. FIG. 2A shows a schematic drawing of input signals and output signals of one embodiment of the instant disclosure. For example, when the common mode filter unit 12 receives the periodical square wave signal formed by the positive voltage VI1 and the negative voltage VI2 and at the moment when the negative voltage VI2 is changed from −0.5 V to +0.5 V as the positive voltage VI1, the positive output voltage VO1 is +1 V. In other words, the positive output voltage VO1 of the output signal generated by the common mode filter unit 12 is twice of the amplitude of the periodical square wave signal which is 0.5 V. Contrarily, when the positive voltage VI1 which is +0.5 V received by the common mode filter unit 12 is changed to the negative voltage VI2 which is −0.5 V, the negative output voltage VO2 is −1 V. On the other hand, when the periodical square wave signal maintains as the positive voltage VI1 during a time duration T1 and maintains as the negative voltage VI2 during the time duration T2, the voltage of the output signal of the common mode filter unit 12 would gradually approach to zero from both the positive output voltage VO1 and the negative output voltage VO2 until the next voltage change in the next period of the square wave signal.

In another embodiment of the instant disclosure, if the signal received by the common mode filter unit 12 is a non-periodical input signal, when the non-periodical input signal is changed from a first voltage to a second voltage, the first output voltage of the output signal is obtained by subtracting the first voltage from the second voltage, and when the non-periodical input signal received by the common mode filter unit 12 maintains at the second voltage the first output voltage of the output signal gradually approaches to zero.

Figure 2B:
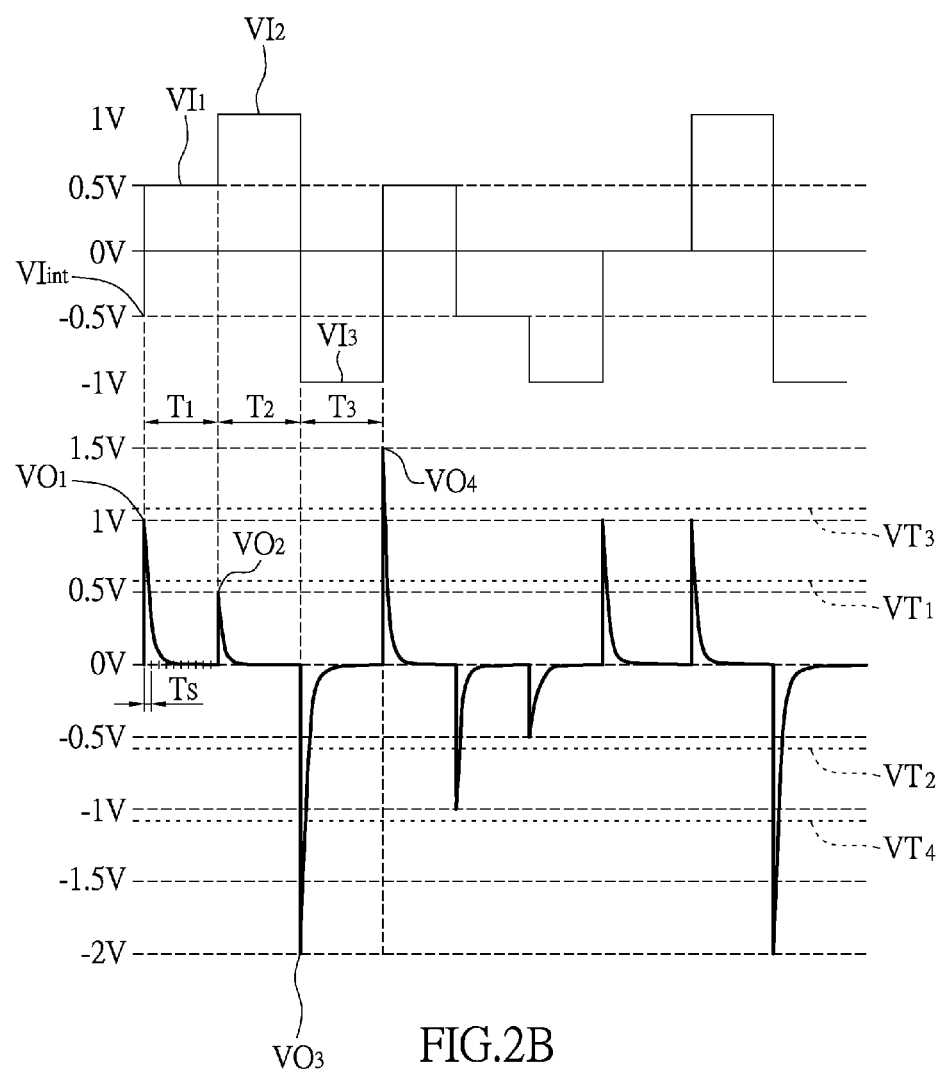
FIG. 2B shows a schematic diagram of input signals and output signals in one embodiment of the disclosure.

Please refer to FIG. 2B. FIG. 2B shows a schematic drawing of input signals and output signals of another embodiment of the instant disclosure. For example, when the common mode filter unit 12 receives the non-periodical input signal formed by the first input voltage VI1, the second input voltage VI2 and the third input voltage VI3, and at the moment when the non-periodical input signal is changed from −0.5 V to the first input voltage VI1 which is +0.5 V, the first output voltage VO1 is +1 V. In other words, when the non-periodical input signal is changed from an initial value VIint which is −0.5 V to the first input voltage VI1 which is +0.5 V, the first output voltage VO1 of the output signal is obtained by subtracting the initial value VIint from the first input voltage VI1. In addition, when the voltage received by the common mode filter unit 12 is changed from the first input signal VI1 which is +0.5 V to the second input voltage VI2 which is +1 V, the second output voltage of the output signal is obtained by subtracting the first input signal VI1 from the second input voltage VI2, which is +0.5 V as shown in FIG. 2B. Also, when the voltage received by the common mode filter unit 12 is changed from the second input voltage VI2 to the third input voltage VI3, the third output voltage VO3 of the output signal is obtained by subtracting the second input voltage VI2 from the third input voltage VI3, which is −2 V as shown in FIG. 2B. The following voltage change can be analogized, and thus the redundant information is not repeated.

The signal generation module 13 comprises a proper logic circuit and/or coding for generating the input signal to the transceiver module 11, wherein the signal generation module 13 controls the voltage and the lasting time duration of the input signal to generate signal patterns and to generate general data signals or coding data signals in the working mode. In the embodiments of the instant disclosure, the signal patterns are, for example, the wake-up signals for waking up the communication device 1 in the power-saving mode such that the communication device 1 enters into the working mode (such as starting up functions of other transmitting-receiving circuits of the transceiver module 11) from the power-saving mode (such as a mode having less power consumption). More precisely, the signal generation module 13 can control the input signal based on the user's setting, for example, to control the duty cycle of the above mentioned periodical square wave signal, that is, to control the lasting time duration of the positive voltage or the negative voltage for generating the needed signal patterns.

Figure 3A:
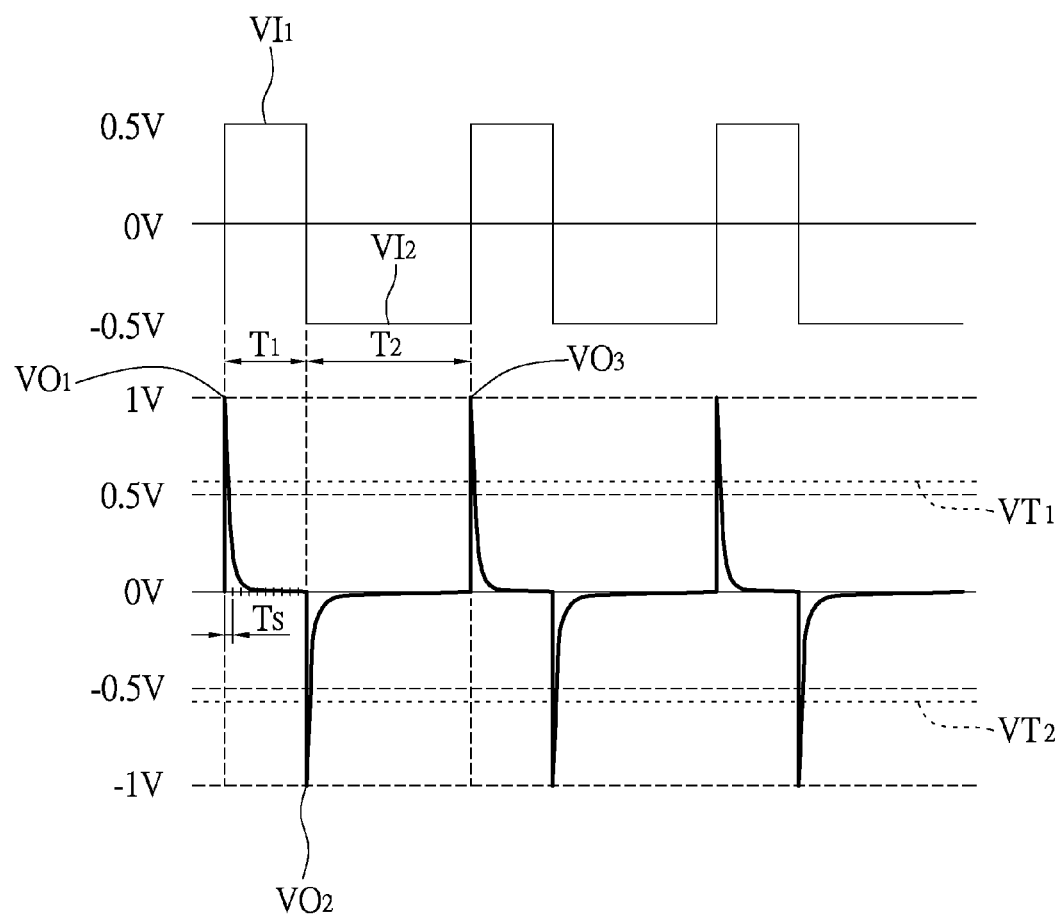
FIG. 3A shows a schematic diagram of input signals and output signals in one embodiment of the disclosure.

Please also refer to FIG. 3A, FIG. 3A shows a schematic drawing of input signals and output signals of still another embodiment of the instant disclosure. For example, in FIG. 3A, the time duration T1 of the positive voltage VI1 and the time duration T2 of the negative voltage VI2 of the periodical square wave signal are 10 ms and 20 ms, respectively. Thus, the voltage of the output signals generated from the common mode filter unit 12 would be repeatedly positive for 10 ms and negative for 20 ms.

Figure 3B:
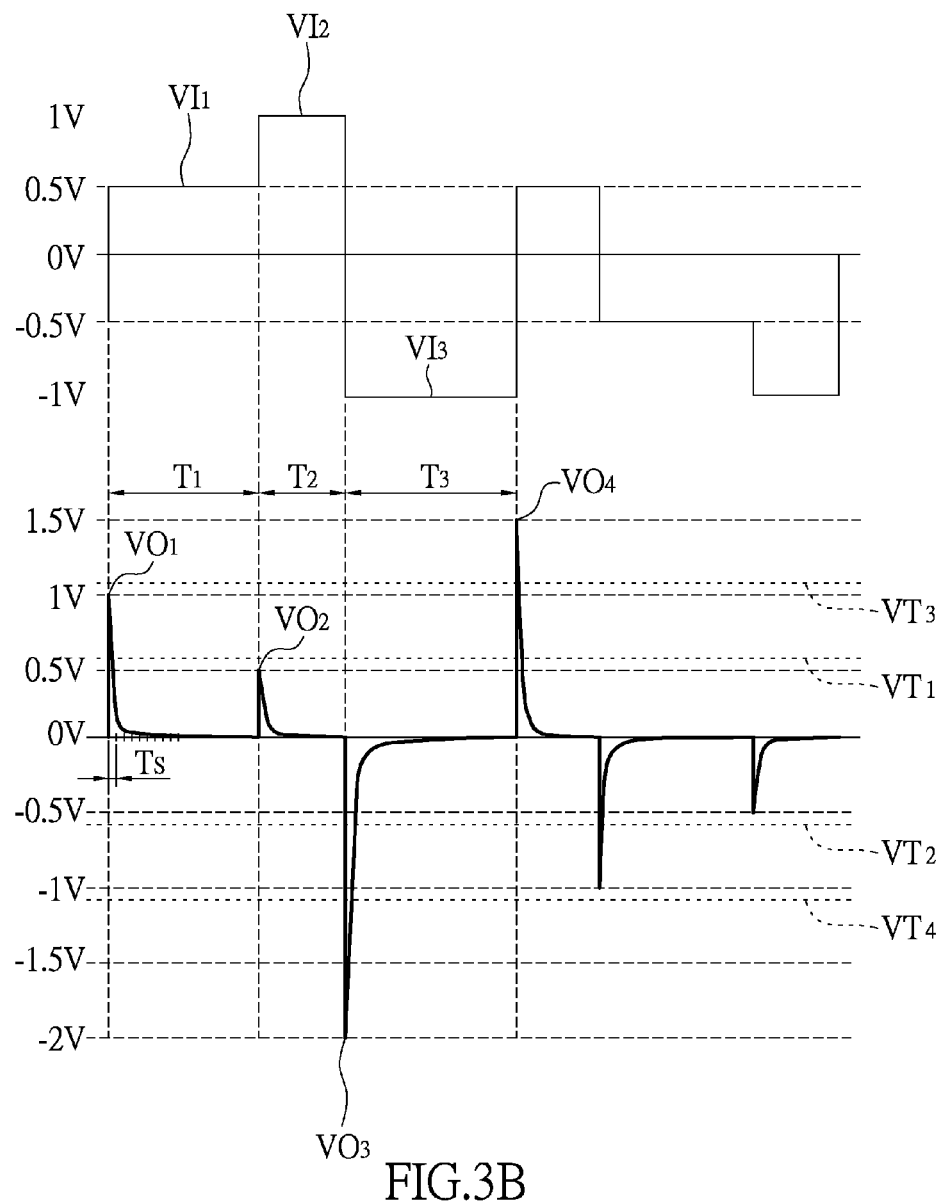
FIG. 3B shows a schematic diagram of input signals and output signals in one embodiment of the disclosure.

In another embodiment of the instant disclosure, the signal generation module 13 can control the input signal based on the user's setting for controlling the voltage of the above mentioned non-periodical input signals and the lasting time durations of different voltages to generate needed signal patterns. Please also refer to FIG. 3B. FIG. 3B shows a schematic drawing of input signals and output signals of still another embodiment of the instant disclosure. For example, the time durations of the first input voltage VI1, the second input voltage VI2 and the third input voltage VI3 of the non-periodical square wave signal are 20 ms, 10 ms and 20 ms, respectively. Thus, the voltage of the output signals generated by the common mode filter unit 12 would be repeatedly changed to different voltages and then last for the corresponding time durations T1, T2 and T3. In other embodiments, not merely coding for the signal patterns, the signal generation module 13 can also code for general data in the working mode and it is not limited herein.

Moreover, there are merely 10 ms and 20 ms time durations used for describing the embodiments of the instant disclosure, while as understood by those skilled in the art different ratios among the time durations can be also applied and the lengths of the time durations T1, T2 and T3 are not limited herein. Therefore, based on the coding complexity (voltage and lasting time duration), the communication device 1 can identify whether the output signal is the wake-up signal set by the user or noise. For example, if it receives the periodical square wave signal with 10 ms time duration of the positive voltage and 20 ms time duration of the negative voltage three times, the communication device 1 identifies that the output signal is the wake-up signal.

The determination unit 14 comprises a proper logic circuit and/or coding for sampling the output signal received from another communication device 1 at each time interval so as to generate a plurality of sampled values. Further, the determination unit 14 compares the sampled values with at least one threshold to generate a comparison result. It is worth mentioning that, at least one threshold can be set for determining the sampled value based on the user's needs. After that, the determination unit 14 identifies the signal pattern corresponding to the output signal transmitted by another communication device 1 according to the comparison result. In addition, the determination unit 14 determines whether the output signal transmitted by another communication device 1 is corresponded to the signal pattern of the wake-up signal or the noise based on the comparison result including the amplitude (as the situations shown in FIG. 2A and FIG. 3A), the different lasting time durations (as the situations shown in FIG. 2B and FIG. 3B which are cases of the non-periodical input signal) or the combination thereof. When the determination unit 14 determines that the output signal transmitted by another communication device 1 is the wake-up signal, it further wakes up other component circuits of the transceiver module 11 such that the transceiver module 11 enters into the working mode and starts the transmission of the data signal.

Figure 1C:
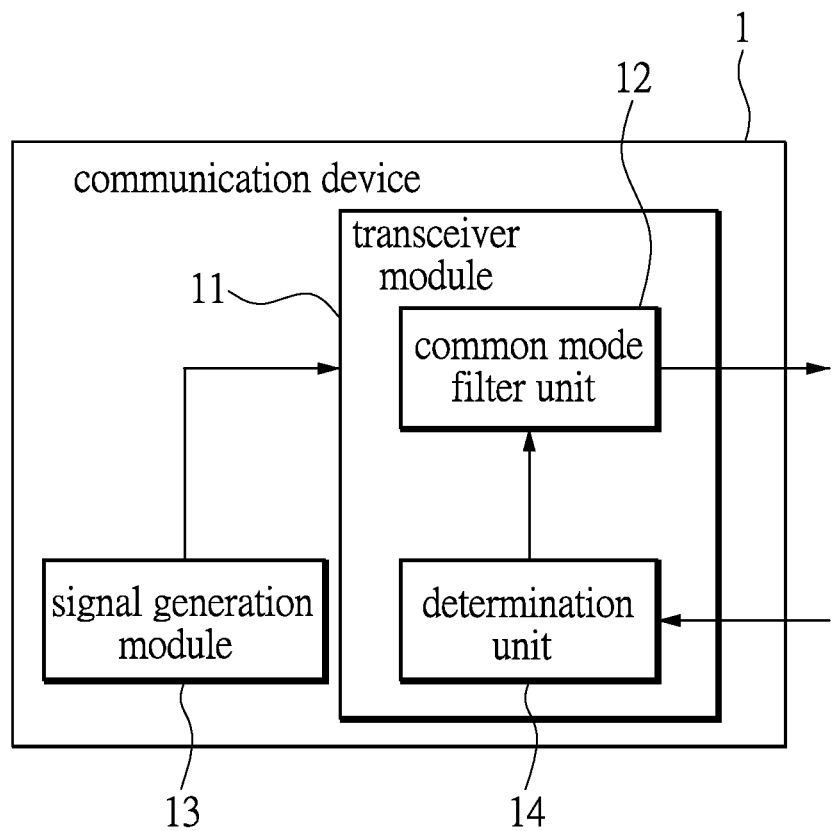
FIG. 1C shows a block diagram of a communication device in one embodiment of the disclosure.

Moreover, please further refer to FIG. 1C. FIG. 1C shows a block diagram of a communication device of another embodiment of the instant disclosure. The difference between the embodiments shown in FIG. 1C and FIG. 1A is that the determination unit 14 can also be configured within the transceiver module 11. In the transceiver module 11, the determination unit 14 is connected to other component circuits such as the common mode filter unit. More precisely, the determination unit 14 would continually receive the output signals from another communication device 1, and further wake up other component circuits when determining the output signal is the wake-up signal, such that the transceiver module 11 enters into the working mode to transmit the data signals. It is worth noting that, after the transceiver module 11 enters into the working mode, the received data signals are output to the common mode filter unit 12 through the determination unit 14 for the later processing. In the embodiments of the instant disclosure, the determination unit 14 can also comprise related decoding circuits or programs in order to directly decode the received data signals which are coded.

Please again refer to FIG. 2A and FIG. 3A. For example, when the determination unit 14 samples the positive output voltage VO1 or the negative output voltage VO2, the determination unit 14 compares the sampled positive output voltage VO1 or the negative output voltage VO2 and the thresholds VT1 and VT2. If the sampled positive output voltage VO1 is greater than the threshold VT1, sampled positive output voltage VO1 would be determined as the value "1" by the determination unit 14, and when the sampled negative output voltage VO2 is less than the threshold VT2, the sampled negative output voltage VO2 would be determined as the value "−1" by the determination unit 14. In addition, the voltages of other sampled output signals would be determined as the value "0".

In FIG. 2A, if the output signals are sampled for 20 times at each time interval Ts within the time durations T1 and T2, the voltages of the output signals in FIG. 2A would be determined as the value "+1" twice, the value "0" for eight times, the value "−1" twice and the value "0" for another eight times. That is, the voltages of the output signals would be determined as the value "+1" twice, the value "0" for sixteen times and the value "−1" twice. In FIG. 3A, if the output signals are sampled for 30 times at each time interval Ts within the time durations T1 and T2, the voltages of the output signals in FIG. 2A would be determined as the value "+1" twice, the value "0" for eight times, the value "−1" twice and again the value "0" for eighteen times. That is, the voltages of the output signals would be determined as the value "+1" twice, the value "0" for twenty-six times and the value "−1" twice. Thus, if the user set the signal pattern based on this rule of numbers (for example, the order of different values or the ratio of numbers of each value among the entire sampling), after receiving determined values the communication device 1 would determine the signal pattern corresponding to the output signals and correspondingly start up or execute the related process in the communication device 1.

Please again refer to FIG. 2B or FIG. 3B. Likewise, when the determination unit 14 samples the first output voltage VO1, the second output voltage VO2, the third output voltage VO3 and the fourth output voltage VO4, the determination unit 14 compares the first output voltage VO1, the second output voltage VO2, the third output voltage VO3 and the fourth output voltage VO4 with the thresholds VT1, VT2, VT3 and VT4. If the first output voltage VO1 is greater than (or equal to) the threshold VT1 and less than the threshold VT3, the voltages of the output signals would be determined as the value "+1". If the second output voltage VO2 is less than the threshold VT1 and greater than the threshold VT2, the voltages of the output signals would be determined as the value "0". If the third output voltage VO3 is less than (or equal to) the threshold VT4, the voltages of the output signals would be determined as the value "−2". If the fourth output voltage VO4 is greater than (or equal to) the threshold VT3, the voltages of the output signals would be determined as the value "+2". The communication device 1 can have more different thresholds VT1, VT2, VT3 and VT4 set by the user, and the values "+2", "+1", "0", "−1" and "−2" are the comparison results of the sampled values of the output signals. According to the numbers of each comparison result, it is determined whether the comparison results are corresponded to the predetermined signal pattern. It is worth mentioning that those skilled in the art would understand that the values of the thresholds and the above rule of numbers are not limited herein.

Figure 4:
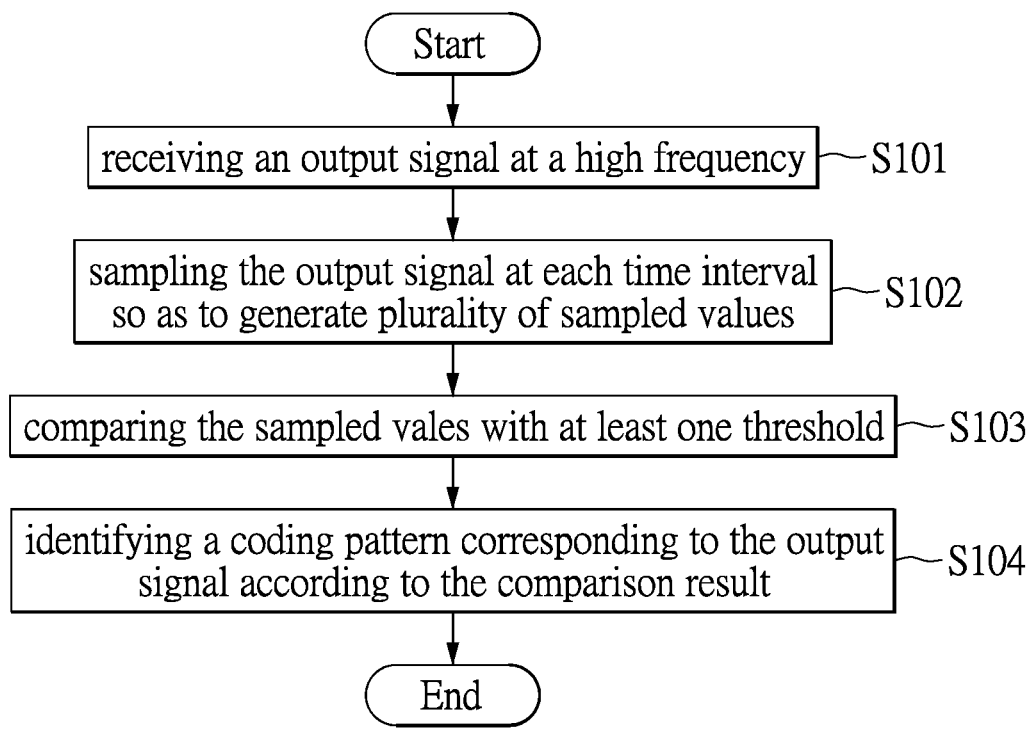
FIG. 4 shows a flow chart of a signal transmission method in one embodiment of the disclosure.

After that, please refer to FIG. 1A and FIG. 4. FIG. 4 shows a flow chart of a signal transmission method of one embodiment of the instant disclosure. In the Step S101, the transceiver module 11 receives the high frequency output signal of another communication device. More precisely, the transceiver module 11 receives the high frequency portion of a square wave signal (that is, the high frequency output signal), which is filtered out via the common mode filter unit 12, such as a high pass filter.

After that, in the Step S102, the determination unit 14 samples the high frequency output signals at each time interval, which are received by the transceiver module. Please again refer to FIG. 2A. FIG. 2A shows a schematic drawing of input signals and output signals of one embodiment of the instant disclosure. As shown in FIG. 2A, the determination unit 14 samples the output signals at each time interval and obtains the sampled values of the positive output voltages VO1 and VO3 and the negative output voltage VO2.

In the Step S103, the determination unit 14 compares the sampled value of the output signal and the thresholds VT1 and VT2, and distinguishes the sampled values via the values "+1", "0" or "−1". However, those skilled in the art should be able to understand that the user can set more thresholds based on need. Also, the length of the time interval can be set by the user based on need. Thus, the number of thresholds and the length of the time intervals are not limited herein.

In the Step S104, according to the comparison between the sampled values and the thresholds in the Step S103 the determination unit 14 calculates the numbers of each value to identify the signal pattern corresponding to the output signal. As mentioned above, if the determination unit 14 samples for 20 times, the voltages of the output signals in FIG. 2A would be determined as the value "+1" twice, the value "0" for eight times, the value "−1" twice and the value "0" for another eight times. That is, the voltages of the output signals would be determined as the value "+1" twice, the value "0" for sixteen times and the value "−1" twice. Thus, if the user sets the signal patterns based on this rule of number, after receiving determined values the communication device 1 would determine the signal pattern corresponding to the output signals and correspondingly start up or execute the related process.

In the Step S104, the determination unit 14 identifies the signal pattern corresponding to the output signal based on the rule of number, additionally the determination unit 14 also checks whether the output signal is the wake up signal set by the user or is merely a misjudgment in the wired channel via the coding complexity (the voltages and the lasting time durations). In other words, the determination unit 14 detects the time duration before the output signal is changed from the positive output voltage VO1 to the negative output voltage VO2 and/or detects the time duration before the output signal is changed from the negative output voltage VO2 to the positive output voltage VO3.

To sum up, the signal transmission method and the communication device provided by the embodiments of the instant disclosure uses the properties of the high pass filter to design a circuit to output an output signal with large amplitude, so as to prevent the noise interference. In addition, the embodiments of the instant disclosure control time durations when the output signal is at different voltages via the signal generation module for coding. Moreover, if the output signal is a wake-up signal, it can prevent a situation that the transceiver module cannot be appropriately wakened up because of the noises.

The descriptions illustrated supra set forth simply the preferred embodiments of the instant disclosure; however, the characteristics of the instant disclosure are by no means restricted thereto. All changes, alterations, or modifications conveniently considered by those skilled in the art are deemed to be encompassed within the scope of the instant disclosure delineated by the following claims.

What is claimed is:
1. A signal transmission method, comprising:
setting at least one threshold, in which the at least one threshold corresponds to at least one voltage level;
receiving an output signal generated by a square wave signal passing through a high pass filter after setting the at least one threshold;
sampling the output signal at each time interval so as to generate a plurality of sampled values;
comparing the sampled values with the at least one threshold to generate a plurality of comparison results; and
identifying a signal pattern corresponding to the output signal according to one or both of amplitudes and timing information of the comparison results;

wherein the step of setting at least one threshold comprises setting at least a first threshold and a second threshold; if one of the sampled values is greater than the first threshold among the thresholds, determining the corresponding comparison result as a first value; if one of the sampled values is smaller than the second threshold among the thresholds, determining the corresponding comparison result as a second value; and if one of the sampled values is between the first threshold and the second threshold, determining the corresponding comparison result as at least one third value.

2. The signal transmission method of claim 1, wherein the at least one third value comprises a fourth value, and if one of the sampled values is between the first threshold and the second threshold, the corresponding comparison result is determined as the fourth value.

3. The signal transmission method of claim 2, wherein the step of identifying the signal pattern comprises:
   identifying the signal pattern according to numbers of the first value, the second value and the fourth value.

4. The signal transmission method of claim 1, wherein the step of identifying the signal pattern comprises:
   detecting a time duration between a positive output voltage and a negative output voltage of the output signal according to the amplitudes and timing information of the comparison results so as to recognize the signal pattern.

5. The signal transmission method according to claim 1, wherein the square wave signal is a non-periodic signal, and the step of identifying the signal pattern comprises:
   detecting a time duration between a first output voltage and a second output voltage of the output signal according to the amplitudes and timing information of the comparison results so as to recognize the signal pattern.

6. The signal transmission method according to claim 1, wherein the at least one third values comprises a fourth value, a fifth value and a sixth value, if one of the sampled values is smaller than the first threshold and greater than a third threshold among the thresholds, determining the corresponding comparison result as the fourth value; if one of the sampled values is greater than the second threshold and smaller than a fourth threshold among the thresholds, determining the corresponding comparison result as the fifth value; and if one of the sampled values is between the third threshold and the fourth threshold, determining the corresponding comparison result as the sixth value.

7. A communication system, comprising:
   a first communication device, comprising:
      a signal generation module configured to generate a square wave signal; and
      a first transceiver module configured to transmit an output signal and comprising:
         a common mode filter unit filtering out a high frequency portion of the square wave signal as the output signal; and
   a second communication device, comprising:
      a second transceiver module configured to receive the output signal; and
      a determination unit having at least one threshold corresponding to at least one voltage level, configured to sample the output signal at each time interval so as to generate a plurality of sampled values, comparing the sampled values with the at least one threshold and generating a plurality of comparison results, and identifying a signal pattern corresponding to the output signal according to one or both of amplitudes and timing information of the comparison results;
   wherein the at least one threshold comprises at least a first threshold and a second threshold; if the one of the sampled values is greater than the first threshold among the thresholds, the determining unit determines the corresponding comparison result as a first value; if one of the sampled values is smaller than the second threshold among the thresholds, the determining unit determines the corresponding comparison result as a second value; and if one of the sampled values is between the first threshold and the second threshold, the determining unit determines the corresponding comparison result as at least one third value.

8. The signal transmission system according to claim 7, wherein the at least one third value comprises a fourth value, and if one of the sampled values is between the first threshold and the second threshold, the determining unit determines the corresponding comparison result as the fourth value.

9. The signal transmission system according to claim 8, wherein the determination unit identifies the signal pattern according to numbers of the first value, the second value and the fourth value.

10. The signal transmission system according to claim 7, wherein the determination unit of the second communication device detects a maintaining time duration until the voltage of the output signal turns from a positive output voltage to a negative output voltage and/or from a negative voltage to a positive voltage according to the amplitudes and timing information of the comparison results for recognizing the signal pattern.

11. The signal transmission system according to claim 7, wherein the at least one third values comprises a fourth value, a fifth value and a sixth value, if one of the sampled values is smaller than the first threshold and greater than a third threshold among the thresholds, the determining unit determines the comparison result as the fourth value; if the sampled values are greater than the second threshold and smaller than a fourth threshold among the thresholds, the determining unit determines the comparison result as the fifth value; and if the sampled values are between the third threshold and the fourth threshold, the determining unit determines the comparison result as the sixth value.

* * * * *